United States Patent [19]

Sakaguchi et al.

[11] 4,120,571
[45] Oct. 17, 1978

[54] MOTION PICTURE CAMERA FOR USE WITH A CARTRIDGE FOR FILM HAVING A SOUND TRACK

[75] Inventors: Keiichi Sakaguchi, Yokohama; Yoshio Komine, Tokyo; Toshikazu Ichiyanagi, Tokyo; Mamoru Shimazaki, Tokyo; Kazuya Hosoe, Machida, all of Japan

[73] Assignee: Canon Kabushiki Kaisha, Tokyo, Japan

[21] Appl. No.: 673,619

[22] Filed: Apr. 5, 1976

Related U.S. Application Data

[63] Continuation of Ser. No. 462,526, Apr. 19, 1974, abandoned.

[30] Foreign Application Priority Data

Apr. 23, 1973 [JP] Japan .................................. 48-46385
Apr. 23, 1973 [JP] Japan .................................. 48-46388

[51] Int. Cl.² ............................................. G03B 31/02
[52] U.S. Cl. ........................................ 352/27; 352/72; 352/180
[58] Field of Search ................. 352/72, 22, 25, 29, 352/27, 180, 174

[56] References Cited

U.S. PATENT DOCUMENTS

| 2,031,836 | 2/1936 | Kellogg | 352/25 |
| 3,492,067 | 1/1970 | Matsubara | 352/12 |
| 3,597,056 | 8/1971 | Sasaki | 352/14 |
| 3,825,327 | 7/1974 | Kosarko | 352/29 |
| 3,880,504 | 4/1975 | Marvin | 352/29 |

Primary Examiner—Monroe H. Hayes
Attorney, Agent, or Firm—Toren, McGeady and Stanger

[57] ABSTRACT

A motion picture camera which can use a cartridge for film having a sound track includes sound recording means and a mechanism which actuates and releases the sound recording means to an operative state and to an inoperative state, respectively, in response to an actuation and a release of a shutter release member. All such parts which are needed to engage a film are arranged in a cartridge chamber defined in the camera housing so that the operator enables to readily insert a cartridge into the chamber so long as the sound recording means are set to their inoperative position.

In another phase of the present invention, in order to insure proper sound effect, a motion picture camera of the type described and having a manually switchable picture image frame frequency control device having a plurality of switched positions is provided with locking means positioned adjacent the control device upon engagement therewith to lock the control device in a particular position for image-sound synchronous recording operation, and operatively associated with one of the switches of the circuit of the sound recording means upon engagement with the control device to close the switch.

8 Claims, 11 Drawing Figures

MOTION PICTURE CAMERA FOR USE WITH A CARTRIDGE FOR FILM HAVING A SOUND TRACK

This is continuation of application Ser. No. 462,526 filed Apr. 19, 1974 now abandoned.

BACKGROUND OF THE INVENTION

1. Field of the invention

This invention relates to motion picture cameras for use with film having a sound track arranged in cartridges, and more particularly to improvments in arrangement of the sound recording means in the cartridge chamber defined in the camera housing and in construction of a mechanism which actuates and releases the sound recording means to and from their operative state respectively in response to an actuation and a release of the shutter release member. Still more particularly the invention relates to a motion picture camera provided with a manually switchable picture image frame frequency control device in combination with locking means therefor.

2. Description of the prior art

Over the years, there has been a wide acceptance in the use of easily manageable cartridges for motion picture film in miniature photography applications. Until comparatively lately, however, the motion picture arts have lacked compact cartridges for roll film with sound track which facilitate loading and sound-image synchronous recording operations. In recent years, the increasing requirement for film with sound track in many photography applications has led to development of cartridges capable of use in sound motion picture cameras, as for example, disclosed in U.S. Pats. Nos. 3,561,851 and 3,604,790.

In loading such cartridges in motion picture cameras in quick and steady fashion which is the most useful phase of the versatility of cartridge, the requirements for accuracy of the loaded position and state are such that the exposure window of the cartridge received in a chamber defined in the camera housing is accurately positioned in alignment with a lens system in the camera, and in addition the portion of the filmstrip positioned adjacent a cutout provided in a portion of the film channel of the cartridge be so correctly positioned with respect to the sound recording means that upon actuation of the latter for sound recording operation, the sound track provided on the vicinity of one edge of the filmstrip is brought into operative relationship with the sound recording elements such as a sound head and a pinch roller extending into the cutout of the cartridge. For this reason, commercially available motion picture cameras with sound recording means mounted therein in fashions known in the prior art cannot receive cartridges for film with sound track without the necessity of complicated time-consuming loading procedure.

In addition to the aforsaid problem, there is another problem that when taking a motion picture sequence with sound accompaniments, the film transporting mechanism should be set to the particular film transportion speed, namely, the particular picture image frame frequency suitable for the sound recording operation, or otherwise unacceptable sound effect will result. In the case of motion picture cameras regulatable to various frame frequencies, it is known to arrange a manually switchable frame frequency control device in the film transporting mechanism but independently of the sound recording means, said device having a plurality of switched positions including a position for recording sound accompaniments with the motion pictures on the filmstrip. With such an arrangement, it has been possible, should an incorrect setting be made, thereby the filmstrip advances across the sound recording station at a speed other than that suitable for sound recording operation.

SUMMARY OF THE INVENTION

The present invention is adapted to obviate the above-mentioned drawbacks. Accordingly, it is an object of the invention to provide a motion picture camera which can receive a cartridge for roll film having a sound track without requiring complicated loading procedure.

Another object of the invention is to provide a motion picture camera comprising a housing whose chamber removably accommodates a cartridge for roll film with a sound track, and sound recording means associated with a mechanism which actuates and releases the sound recording means occupying a space within a cutout provided in the cartridge to an operative state and to an inoperative state, respectively, in response to an actuation and a release of the camera shutter release member, all such parts of said recording means which are needed to insure proper sound recording being arranged in the cartridge chamber in such a way that so long as the mechanism is set to the released position, the cartridge can be easily inserted into the chamber without causing damage to that portion of the filmstrip positioned adjacent the cutout as well as the parts which must enter the cutout, and seated with utmost accuracy at a predetermined position within the cartridge chamber.

Another object of the invention is to provide a motion picture camera provided with sound recording means having an inoperative state where the filmstrip is disengaged therefrom and having an operative state for recording sound signals on the sound track provided on the vicinity of one edge of the filmstrip and with an actuating mechanism which actuates and releases said sound recording means to an operative state and to an inoperative state, respectively, in response to an actuation and a release of the camera shutter release member, which camera comprises a housing whose cartridge chamber is provided with spring-biased pressure means mounted on the rear wall thereof upon insertion of the cartridge into the chamber for biasing the cartridge toward the front wall having a camera aperture opening so that the exposure window of the cartridge abutly engages the opening in alignment with a lens system in the camera.

Still another object of the invention is to provide a motion picture camera of the type described and regulatable to various picture image frame frequencies. The camera includes sound recording means and a manually switchable frame frequency control device having a plurality of switched positions including a position for setting the camera to the image-sound synchronous recording operation condition, said frame frequency control device being provided with a locking means movably mounted in the camera housing to be manually engageable with said control device so long as the control device is set to the position for image-sound synchronous recording operation, and operatively associated with one of the switches of the electrical circuit for the sound recording means upon engagement with the control device to close the switch.

Other objects and features of the present invention will become apparant to those skilled in the art upon perusal of the following detailed description of certain specific embodiments with reference to the accompanying drawings.

BRIEF DESCRIPTION OF THE DRAWINGS

As shown in FIG. 1, a prior art cartridge which has found a wide acceptance in the home motion picture arts for picture taking purposes only comprises a light tight housing 21 having an exposure window 22 formed in the front wall and which accommodates a filmstrip 23 having perforation holes 27, and coaxial film supply and take-up reels 26 rotatably mounted in the cartridge. The housing 21 is further provided with a film guide 24 and a notch 25 indicating the film sensitivity.

Referring now to FIG. 2, there is shown a cartridge which is adapted for use in a sound motion picture camera, the cartridge comprises a light tight housing 1 having an exposure window 2 formed in the front wall thereof and which accommodates film 3 having a magnetic sound track 8 provided on the vicinity of one edge thereof and having perforation holes 10 provided on the vicinity of the other edge, and film supply and take-up reels mounted on a common shaft 6. The housing is further provided with a film guide 4, a notch 5 indicating the film sensitivity, and a cutout 11 which the sound recording elements enter when the cartridge is properly inserted into the cartridge chamber of the camera housing.

Figure 1:
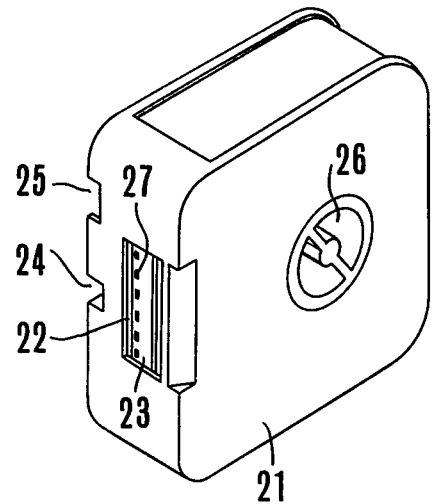
FIG. 1 is a perspective view of a prior art film cartridge which is adapted only for use in a motion picture camera including no sound recording means.
Figure 2:
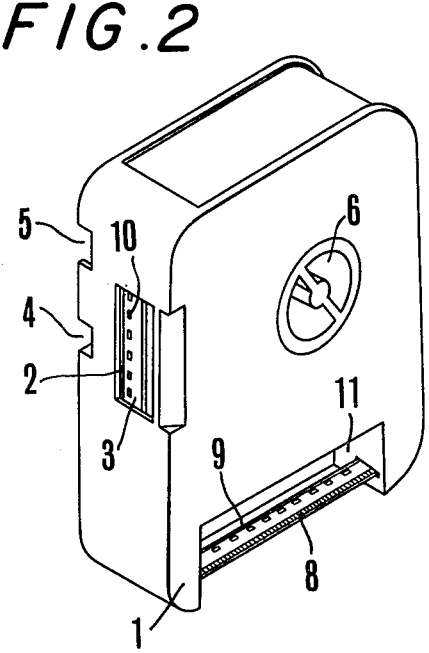
FIG. 2 is a perspective view of an example of the cartridge which accommodates film with a sound track and which is capable of use in the motion picture camera of the present invention.
Figure 3:
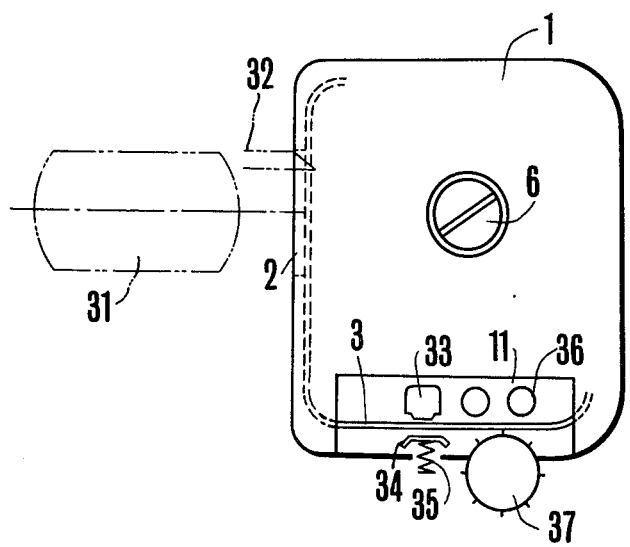
FIG. 3 is a fragmentary schematic side elevational view of a motion picture camera adapted for use with the cartridge of FIG. 2 and embodying the basic form of the present invention wherein all those parts non-essential for the invention have been omitted and various elements necessary for sound signal recording are in inoperative relationship with the filmstrip.
Figure 4:
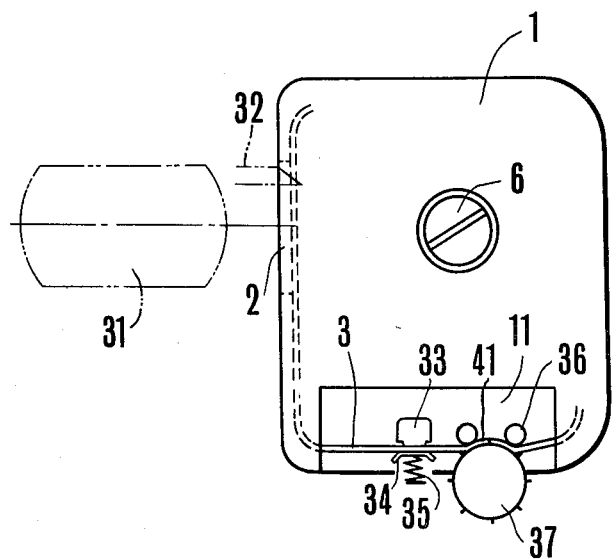
FIG. 4 is a fragmentary schematic side elevational view of the motion picture camera of FIG. 3 wherein said various elements of the sound recording means are in engagement with the filmstrip to make ready sound signal recording operation.

The present invention in its principle aspect is illustrated in FIGS. 3 and 4 with respect to arrangement of the sound recording elements in a motion picture camera which removably accommodates the film cartridge of FIG. 2. The motion picture camera includes a lens system 31, a film pull-down claw 32, a sound signal recording head 33, a felt pad 34 which is normally biased upwardly by a helical expansion spring 35, film guide rollers 36 and a film advancing means 37 such as a sprocket and a pinch roller. When the motion picture camera is set to an inoperative condition, all such parts of the sound recording means which are needed to insure proper sound recording are moved away from contact with the adjoining portions of the filmstrip 3 positioned in the cutout 11 as shown in FIG. 3. In this state, the cartridge can be readily removed and inserted into the cartridge chamber. When the sound recording means are actuated to their active state in response to an actuation of the shutter release member not shown through the intermediary of a suitable mechanism shown, a combination of the sound signal recording head 33 and the film guide rollers 36, or a combination of the felt pad 34 and the film advancing means 37 is moved to engage the film 3 as shown in FIG. 4.

Figure 5:
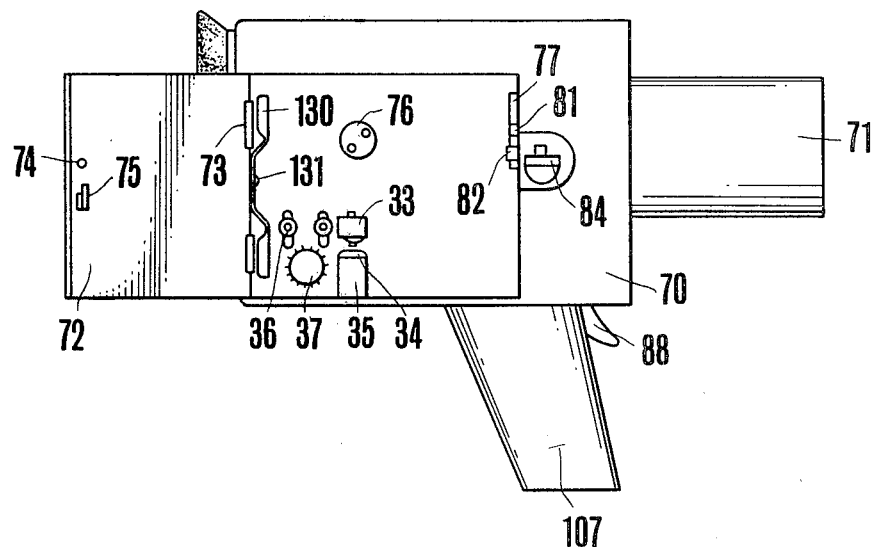
FIG. 5 is a side elevational view of an preferred embodiment of a motion picture camera with sound recording means according to the present invention, the door of the cartridge chamber being opened.
Figure 6:
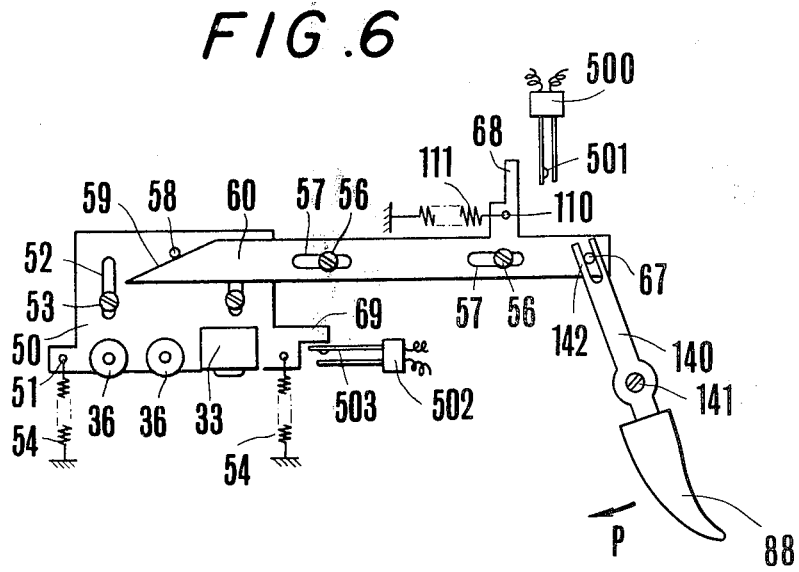
FIG. 6 is a side view of the mechanism which actuates and releases the sound recording means in response to an actuation and a release, respectively, of a camera shutter release member.

According to a preferred embodiment of the invention, as shown in FIGS. 5 and 6, the sound recording means are arranged in the camera housing in such manner that the combination of the sound signal recording head 33 and the film guide roller 36 is movable with reference to the housing, while the combination of the felt pad 34 and the film advancing means 37 is in fixed positions with reference to the housing. The sound motion picture camera shown in FIG. 5 comprises a housing 70, an objective mount 71 connected thereto, a grip 107 and a shutter release button 88. The housing has a door 72 hinged thereon at portions 73, and its chamber can receive the cartridge of FIG. 2. The door 72 is provided with a projection 75 having a recess formed therein for engagement with a movable member extending into the cartridge chamber, so that upon closure of the door 72, the movable member engages in the recess of the projection 75 to firmly lock the door 72. The housing 70 further includes a clatch means 76 extending into the cartridge chamber for engagement with the cartridge shaft 6 (see FIGS. 2, 3 and 4), an aperture plate 77 of the camera which registers with the exposure window when the cartridge is properly inserted into the chamber, a door locking key 84 of the door locking device 82. The cartridge chamber is provided with a spring-biased presser 130 fixedly mounted on the rear wall thereof by means of a screw 131 upon insertion of the cartridge to urge the cartridge against the front wall having the aperture plate 77.

A mechanism which actuates and releases the sound recording means to an operative state and to an inoperative state, respectively, in response to an actuation and a release of the shutter release member having a button 88 is illustrated in detail in FIG. 6 as comprising two slide members 50 and 60. The slide member 50 carrying a sound recording magnetic head 33 fixedly mounted thereon and two film guide rollers 30 rotatably mounted thereon has two vertically elongated slots 52 in which two pins 53 fixedly mounted in the housing are engaged individually to guide the slide 50 for vertical movement. The slide 50 is normally biased downwardly by two helical tension springs 54 one ends of which are engaged in the holes 51 and the other ends of which are connected to the housing. The other slide member 60 has two horizontally elongated slots 57 in which two pins fixedly mounted in the housing are individually engaged to guide the slide 60 for holizontal movement and is normally biased rearwardly by a helical tension spring 111, one end of which is engaged in a hole 110 provided in the projection 68 and the other end of which is connected to the housing. Mounted on one end of the slide 60 is a pin 67 which is engaged in the recess 142 formed in the end of one arm of a lever 140 which is fulcrumed on a pin 141 fixedly mounted in the housing. As the lever 140 is turned in the clockwise direction by depression of the button 88 mounted on the end of the other arm of the lever 140, the slide moves to the right against the force of the spring 111. In order to transmit a horizontal motion of the slide 60 to a vertical motion of the slide 50, there is provided a cam follower 58 planted on the slide 50 and abutting the sloping cam surface 59 tapered in one end of the slide 60. Positioned adjacent the projections 68 and 69 are switches 500 and 502 associated respectively, with a camera shutter drive circuit and with a sound recorder circuit to be later described, so that such a sliding forward movement of the slide 60 results in engagement of a movable contact 501 of the switch 500 with a fixed contact thereof, while simultaneous sliding downward movement of the slide 50 results in engagement of a movable contact 503 of the switch 502 with a fixed contact thereof.

The operation of the motion picture camera of FIG. 5 is as follows. In order to load the cartridge 1 into the chamber, the door 72 is opened and the cartridge is inserted into the chamber from a direction nearly perpendicular to the paper plane. When the cartridge is seated in the chamber, the spring-biased presser 130 urges the cartridge against the aperture plate 77, thereupon the cartridge assumes a predetermined optimum position. The operator then closes the door to make ready the camera for motion picture taking operations with sound accompaniments. Upon depression of the shutter release button 88 in the direction indicated by arrow R (FIG. 6), the lever 140 is turned about a pivot pin 141 in the clockwise direction to move the slide 60 to the right against the force of the spring 111. Such a sliding movement of slide 60 causes the other slide 50 to move downwardly under attraction of the springs 54, thereby the switches 500 and 502 are closed simultaneously, or successively in a certain time interval to render operative the shutter drive circuit and the sound recorder circuit respectively. Movement of the slide 50 to the downmost advanced position automatically results in proper engagement of the film with the film guide rollers 36, sound signal recording head 33, the sprocket 37 and felt pad 34.

It will be now recognized from the foregoing description that the present invention provides a motion picture camera comprising a housing whose chamber removably accommodate a cartridge for roll film with a sound track, and sound recording means associated with a mechanism which actuates and releases the sound recording means occupying a space within a cutout provided in the cartridge to an operative state and to an inoperative state, respectively, in response to an actuation and a release of the camera shutter release member, said recording means being arranged in the cartridge chamber in such a way that so long as the mechanism is set to the released position, the cartridge can be easily inserted into the chamber without causing damage to that portion of the filmstrip positioned adjacent the cutout as well as the parts which must enter the cutout, and seated with utmost accuracy at a predetermined position within the cartridge chamber.

Figure 7:
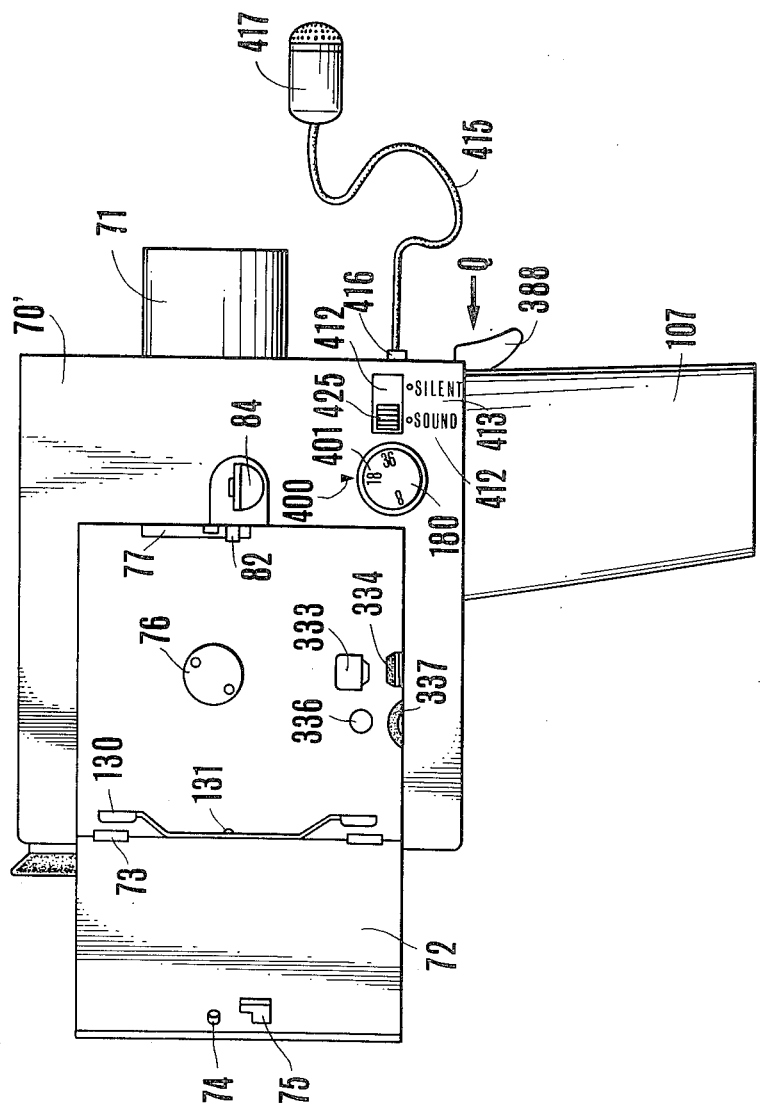
FIG. 7 is a side elevational view of another preferred embodiment of a motion picture camera regulatable to various picture image frame frequencies in accordance with the invention, the door of the cartridge chamber being opened, in which the cartridge chamber is provided with a spring-biased pressor mounted on the rear wall thereof and with sound recording means mounted therein in a fashion different from that shown in FIG. 5.
Figure 8:
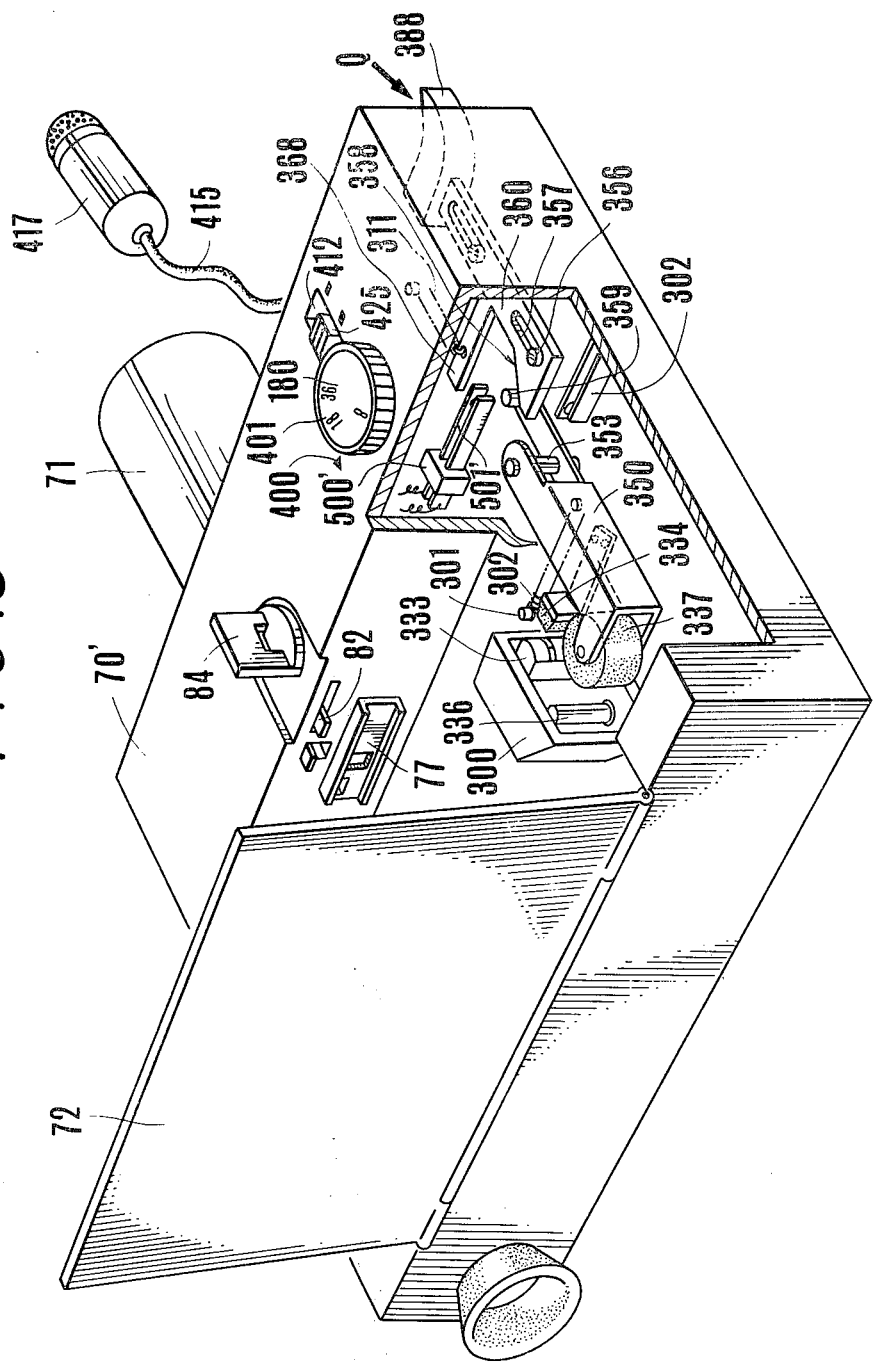
FIG. 8 is a perspective view of the motion picture camera of FIG. 7 with portions of the housing broken away to reveal details of the sound recording means and of an actuating mechanism therefor.
Figure 9:
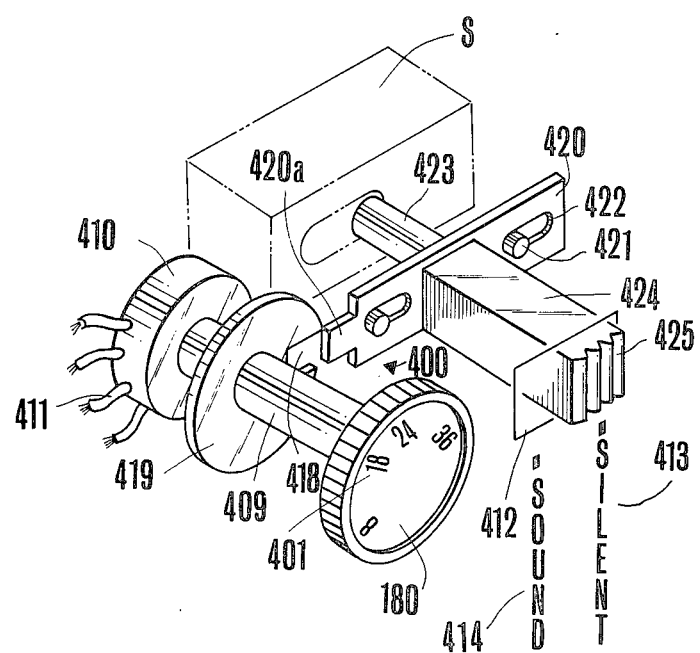
FIG. 9 is a schematic exploded perspective view of a manually switchable picture image frame frequency control device and locking means, which are adapted for use in the motion picture camera of FIG. 7 or 8.

Another embodiment of a motion picture camera with sound recording means of the functions described above, and particularly with a picture image frame frequency control device in combination with a locking means according to the present invention is illustrated in FIGS. 7, 8 and 9, in which the same parts as those shown in FIG. 5 have like reference characters. As illustrated in FIGS. 7 and 8, the motion picture camera comprises sound recording means of functions identical to those described in connection with FIGS. 5 and 6 but with some modifications in arrangement and construction, and an actuating mechanism therefor of a construction largely different from that of the mechanism described in connection with FIG. 6. The mechanism is constructed as comprising a slide member 360 having a shutter release button 388 fixedly mounted at one end thereof and a lever member 360. The slide member 350 has two elongated slots 357 in which two pins 357 fixedly mounted in the housing are individually engaged, and it has a sloping cam 358 tapered on one end opposite to that having the shutter release button 88 for engagement with a cam follower 359 planted on one arm of the lever member 350 which is fulcrumed on a pin 353. Carried on the other arm of the lever 350 are a pinch roller 337 rotatably mounted thereon and a felt pad 334 fixedly mounted thereon. The lever 350 is normally biased in the clockwise direction by a helical tension spring 302 to urge the cam follower 369 against the cam surface 358. The slide 360 has a projection 368 projecting upwardly and is normally biased forwardly by a helical tension spring 311. A switch 500 associated with the sound recorder circuit and a switch 302 associated with the shutter drive circuit are positioned adjacent the projection 368 and the tapered end 358 of the slide 350, respectively, so that upon actuation of the shutter release button, the movable contacts engage their respective fixed contacts. The motion picture camera further includes a manually switchable picture image frame frequency control device shown in FIG. 9 of which the rotary switchable control knob 180 having a frame frequency scale 401 on the face thereof is provided on the side wall of the camera housing as shown in FIGS. 7 and 8, and which can be set with its index mark 400 in any of the positions. Positioned adjacent the control knob 180 is a selector knob 425 movable between "Sound" position and "Silent" position, so long as the control knob 400 is set to a particular position, for example, 24 frames per second position.

In FIG. 9, the picture image frame control device is illustrated as comprising a control knob 180, a disk 419 having a recess or notch 418 and mounted on the shaft 409, and a switch 410 connected to a servo motor control circuit known in the prior art. Positioned adjacent the control device is a locking means comprising a selector knob 425 mounted on a slide member 420. The slide member 420 has two slots 422 in which the pins 421 mounted on the housing are engaged, and it has a projection 420a engageable with the recess 418 of the disk 419 to lock the control device in the particular position. The slide member 420 further includes a pole 423 mounted thereon and associated with one of the switches of the sound recorder control circuit including, for example, a power switch of the circuit for the sound recording means.

The operation of the actuating mechanism provided on in the motion picture camera of FIGS. 7 and 8 is as follows. When the shutter release button 388 is depressed by the camera operator in the direction of arrow Q, the slide member 360 is moved to the right against the force of the spring 311. Such a sliding movement causes the lever member 350 to turn under attraction of the spring 302 in the clockwise direction so that the felt pad 334 and the pinch roller 337 carried on the lever member 350 are brought into contact with the sound head 333 and the capstan 336 respectively. The sliding movement of the slide member 360 first closes the switch 500 associated with the sound recorder circuit, and then closes the switch 302 associated with the shutter drive circuit. When the shutter release member is released, the slide member 360 returns to its initial position under the attraction of the spring 311 and simultaneously the sound recording elements carried on the lever member 350 are released to the inoperative position.

The operation of the picture image frame control device shown in FIGS. 7-9 is as follows. When the motion picture camera which accommodates a cartridge for film without sound track is operated, the selector knob 425 is set to the "Silent" position. In this case, the rotary switchable control knob 180 can be set to any of the positions. When the cartridge for film with sound track is used, the control knob 180 is set to a particular position, for example, 24 frames per second position suitable for sound recording, and then the selector knob is set to "Sound" position to close one of the switches of the sound recorder circuit S.

Figure 10:
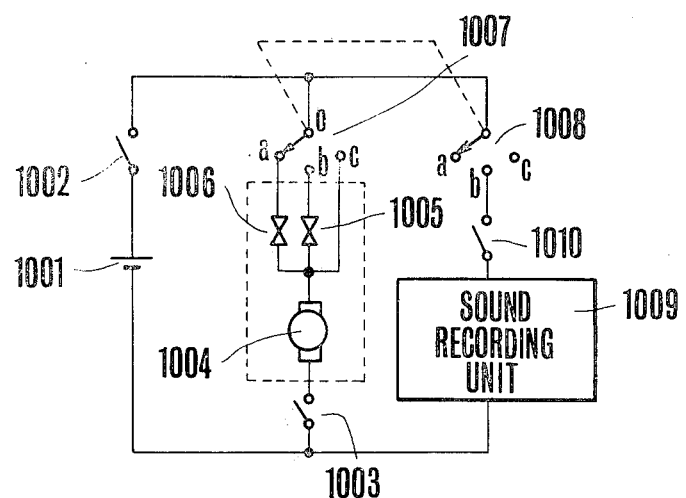
FIG. 10 is a diagram of an example of the electrical circuit associated with the manually switchable frame frequency control device and with the locking means showin in FIG. 9.
Figure 11:
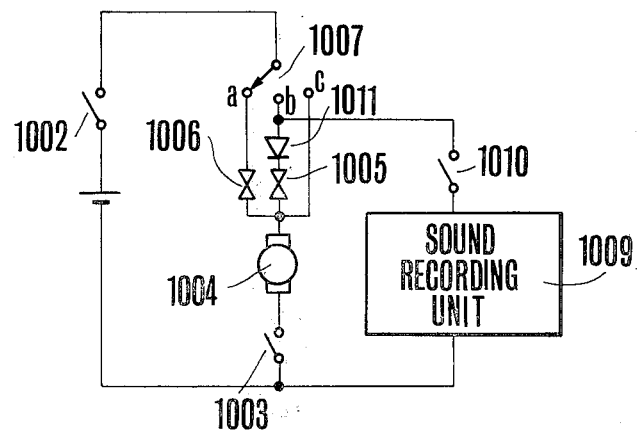
FIG. 11 is a diagram of the electrical circuit shown in FIG. 10 with modifications.

In FIG. 10, there is shown an example of the circuit of the motion picture camera of FIGS. 7 and 8. The circuit comprises a power source 1001, a main switch 1002, a shutter release switch 1003 coresponding to the switch 302, a direct current motor 1004, a mechanical governer 1005 for driving the motor 1006 into rotation at a speed corresponding to 24 frames per second, a mechanical governer 1006 for driving the motor 1006 into rotation at a speed corresponding to 18 frames per second, a three-position switch 1007 for selecting the film transportation speed constructed to be switchable in response to operation of the control knob 180, a switch 1008 which is closed only when the selector knob is set to "Sound" position, a sound recording unit 1009 known in the art and including a capstan and a magnetic sound head, and a switch 1010 corresponding to the switch 500. In FIG. 11, there is shown another example of the circuit of the motion picture camera shown in FIG. 7 or 8. Instead of using the switch 1008, there is provided a diode 1011 connected between the terminal, b, of the switch 1007 and the mechanical governer 1005 to prevent the application of a voltage to the sound recording unit 1009 through the switch 1010 when the switch 1007 is set to a position other than the position b for a film transportation speed of 24 frames per second.

What is claimed is:

1. A motion picture camera for use with a roll of sound signal recordable photographic film, said film having a first film path for exposure of the film and a second film path for sound signal recording of the film, comprising:
   a housing;
   picture taking means mounted in the housing for taking motion pictures in the form of motion picture frames on the film along said first film path;
   sound recording means mounted in the housing for recording sound signals on the film along said second film path;
   framing speed changing means coupled to said picture taking means for selecting a predetermined motion picture framing speed applicable to simultaneous sound signal recording; and
   connecting means coupled to said framing speed changing means and said sound recording means for changing over from a picture taking state without sound accompaniment to a picture taking state with sound accompaniment in response to the selecting operation of said framing speed changing means.

2. A motion picture camera according to claim 1, in which said sound recording means includes third switch means to actuate an audio circuit means and said audio circuit means.

3. A motion picture camera accordint to claim 2, wherein said driving means includes frame speed changing means and wherein said third switch means is functionally connected with said framing speed changing means.

4. A motion picture camera for use with a roll of sound signal recordable photographic film comprising:
   a housing;
   picture taking means mounted in the housing for taking motion pictures in the form of motion picture frames on the film;
   sound recording means arranged in the housing for recording sound signals on the film;
   frame-speed setting means mounted in the housing to be operable outside of the housing and being settable to a predetermined framing speed applicable to pictures with sound accompaniment; and
   blocking means operably associated with said frame-speed setting means for blocking the operation of said sound recording means when said frame-speed setting means is not set to said predetermined framing speed.

5. A motion picture camera as in claim 4, wherein said frame-speed setting means includes an electrically change-over selectable switch member movably associated with said setting means.

6. A motion picture camera for use with elongated film which has a photographic track and a sound recording track, said camera comprising a housing, picture taking means in the housing for exposing motion picture frames onto the photographic track when the film is mounted in the housing, recording means in the housing for recording sound on the sound recording track when the film is mounted in the housing, a photographic energizing switch coupled to said sound recording means for initiating operation of said sound recording means, an energizing switch coupled to said picture taking means for initiating operation of said picture taking means, said sound recording means including a recording head and film guide means as well as movable mounting means supporting said recording head and said film guide, said sound recording means further including a first biasing arrangement coupled to said mounting means and a coupling member coupled to said mounting means as well as a second biasing arrangement coupled to said coupling member, a trigger coupled to said coupling member and having a quiescent condition and an operating condition, said switches each being in the path of movement of said coupling member and mounting means, said switches and said mounting member as well as said biasing arrangements and said coupling member being arranged relative to said trigger and each other so that when said trigger is in the quiescent position said second biasing arrangement biases said coupling member in a direction in which the latter moves said mounting means and the head and guide against the force of the first biasing arrangement and out of contact with the film and the switches and so that when the trigger is in the operation position said trigger biases said coupling member against the force of the first biasing arrangement and into actuating contact with one of the switches while releasing said mounting means so that said first biasing arrangement moves the mounting means to a position where the head and the guide engage the film and the mounting means closes the other of the switches.

7. An apparatus as in claim 6, wherein said coupling member includes a cam surface and said mounting means includes a follower in engagement with the cam surface.

8. An apparatus as in claim 7, wherein said sound recording means includes guide means for constraining said mounting means to move transverse to the direction of the film at said recording head and second guide means for constraining said coupling member to move parallel to the film at said recording head.

* * * * *